(12) United States Patent
Nodzykowski

(10) Patent No.: US 9,447,859 B2
(45) Date of Patent: Sep. 20, 2016

(54) LOCKING DIFFERENTIAL GEAR CARRIER HAVING AN INTEGRATED LOCKING ACTUATOR

(71) Applicant: ARRMA DURANGO LTD, Ashby-de-la-Zouch (GB)

(72) Inventor: Wojciech Nodzykowski, Ashby-de-la-Zouch (GB)

(73) Assignee: ARRMA DURANGO LTD, Ashby-de-la-Zouch (GB)

( * ) Notice: Subject to any disclaimer, the term of this patent is extended or adjusted under 35 U.S.C. 154(b) by 221 days.

(21) Appl. No.: 14/246,959

(22) Filed: Apr. 7, 2014

(65) Prior Publication Data

US 2015/0285354 A1    Oct. 8, 2015

(51) Int. Cl.
*F16H 48/08*    (2006.01)
*F16H 48/24*    (2006.01)
*F16H 48/34*    (2012.01)

(52) U.S. Cl.
CPC ............. *F16H 48/24* (2013.01); *F16H 48/08* (2013.01); *F16H 48/34* (2013.01); *F16H 2048/343* (2013.01)

(58) Field of Classification Search
CPC ........ F16H 48/08; F16H 48/24; F16H 48/34; F16H 2048/343
See application file for complete search history.

(56) References Cited

U.S. PATENT DOCUMENTS

| 1,723,901 | A | 8/1929 | Todd |
| 6,432,020 | B1 * | 8/2002 | Rivera ................... F16H 48/08 475/231 |
| 6,551,209 | B2 * | 4/2003 | Cheadle ................. F16H 48/22 192/84.92 |
| 6,976,553 | B1 | 12/2005 | Dahl et al. |
| 7,101,312 | B2 | 9/2006 | Bauerle et al. |
| 8,096,913 | B2 | 1/2012 | Allmendinger et al. |
| 2004/0248692 | A1 | 12/2004 | Bryson et al. |

OTHER PUBLICATIONS

Venom Group, "Venom Creeper Rock Crawler Manual", 2008, 44 pages, Venom Group International, Hayden, Idaho.

* cited by examiner

*Primary Examiner* — Derek D Knight
(74) *Attorney, Agent, or Firm* — Drinker Biddle & Reath LLP

(57) ABSTRACT

A locking differential gear carrier comprises a gear carrier housing, a first output shaft, a second output shaft differentially linked to the first output shaft, an internal gear affixed perpendicular to the first output shaft and disposed within the gear carrier housing, and a locking actuator assembly. The locking actuator assembly is disposed exterior to the gear carrier housing and includes a locking ring to which a pin is affixed, the locking ring movable by a servo motor toward and away from the gear carrier housing, the pin disposed in parallel with the first output shaft and passing through the gear carrier housing to selectively engage with a recess of the internal gear to lock the first output shaft to the gear carrier housing and cause the first output shaft and the second output shaft to rotate synchronously.

18 Claims, 11 Drawing Sheets

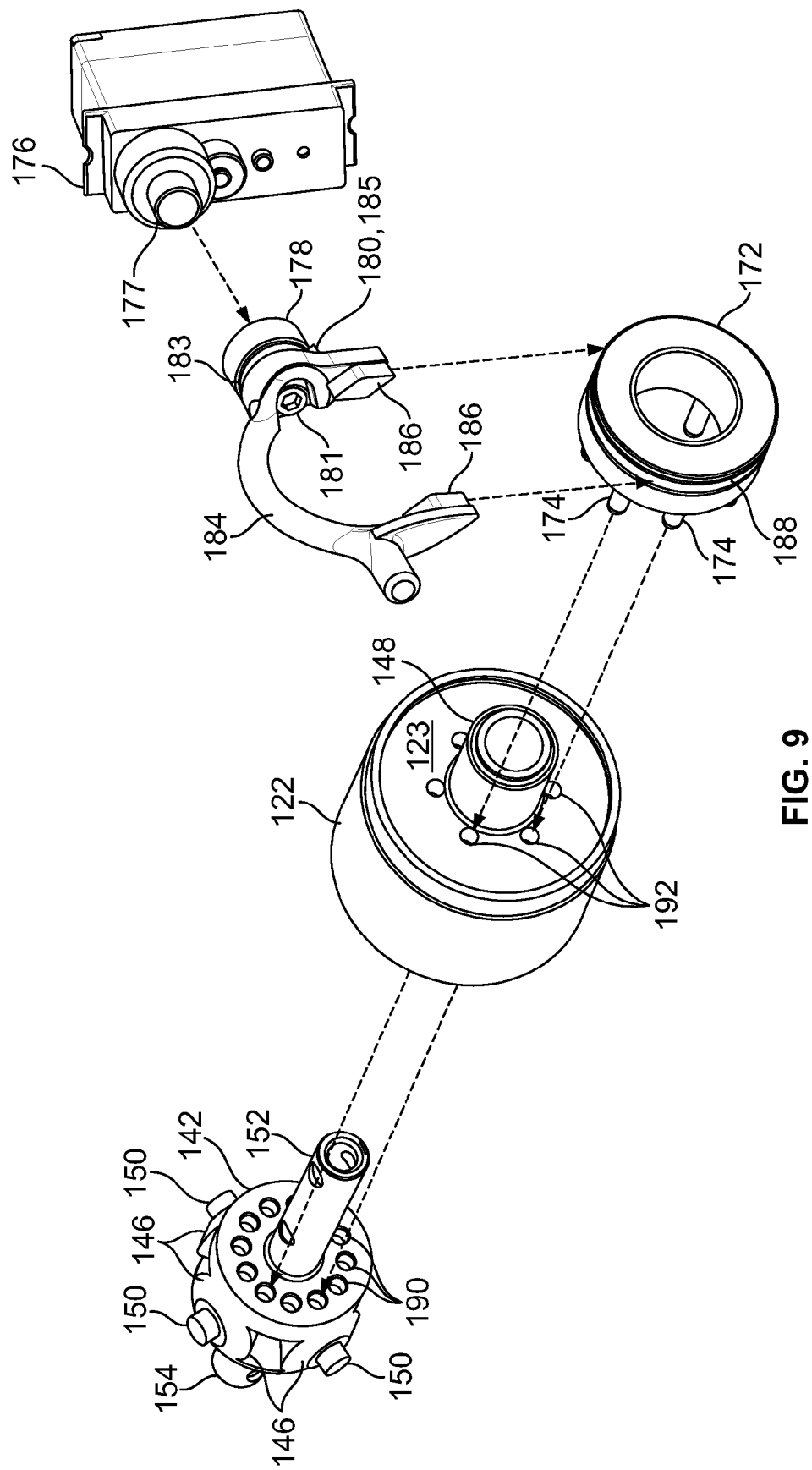

LOCKING DIFFERENTIAL GEAR CARRIER HAVING AN INTEGRATED LOCKING ACTUATOR

FIELD OF THE DISCLOSURE

This disclosure relates generally to differential gear carriers for model vehicles, and, more particularly, to a locking differential gear carrier having an integrated locking actuator.

BACKGROUND

A differential assembly for a vehicle is typically utilized to drive two drive wheels from a single motor via a drive shaft. A locking differential may operate in either an open mode, or a locked mode. In the open mode, the differential equalizes torque in the two drive wheels while maintaining a constant relationship between the average angular velocity of the two drive wheels and the angular velocity of the drive shaft from the motor. This is particularly beneficial when the vehicle turns, and one drive wheel must travel a greater distance than the other drive wheel as the vehicle negotiates the turn. However, sometimes one drive wheel loses traction, for example, on a slippery surface or on variable terrain. In the open mode, the loss of traction in one wheel would limit the torque available to the other wheel. In such circumstances, it is desirable to lock the differential to prevent the effects of traction differences between the two drive wheels of the open differential. Locking the differential eliminates or reduces the ability for the two wheels to spin at different rates. By ensuring that both wheels turn at the same rate, the wheel with traction is ensured to receive the available torque.

U.S. Pat. No. 8,096,913 entitled "Locking Differential Assembly for a Model Vehicle" and issued Jan. 17, 2012, to Allmendinger, et al., discloses a locking differential assembly for a model vehicle in which a locking clutch assembly including a slider member is mounted on an output shaft of a differential gear carrier. The locking clutch assembly locks the output shaft to the differential gear carrier to disable the differential action of the differential gear carrier by extending a pin through the output shaft to rotationally couple the output shaft to the slider member while the slider member engages an external face of the differential gear carrier. However, concentrating the torque on a single pin inserted through a perpendicular hole through a drive axle creates great stresses, and may lead to mechanical failure.

SUMMARY

According to an embodiment, a locking differential apparatus includes an outer housing, a drive shaft disposed at least partially within the outer housing, and a differential gear carrier disposed within the outer housing. The differential gear carrier is configured to rotate in response to rotation of the drive shaft. The differential gear carrier includes a gear carrier housing, a first output shaft disposed at least partially within the gear carrier housing, and a disc affixed perpendicular to the first output shaft to rotate synchronously with the first output shaft. The disc is disposed within the gear carrier housing and has a recess configured to engage with a pin. The locking differential apparatus also includes a second output shaft disposed at least partially within the gear carrier housing. The first output shaft and the second output shaft are differentially linked by the differential gear carrier to maintain a constant relationship between a rotation rate of the drive shaft and the average rotation rate of the first output shaft and the second output shaft while the second output shaft rotates at a variable rate different from a rotation rate of the first output shaft. The locking differential apparatus also includes a locking actuator assembly disposed within the outer housing and exterior to the gear carrier housing. The locking actuator assembly includes a pin disposed in parallel with the first output shaft and passing through the gear carrier housing to selectively engage with the recess of the disc affixed perpendicular to the first output shaft to lock the first output shaft to the gear carrier housing and cause the first output shaft and the second output shaft to rotate synchronously.

The locking actuator assembly may include a locking ring disposed within the outer housing, wherein the pin is affixed to the locking ring and the locking ring is movable in a direction parallel with the first output shaft toward the gear carrier housing to engage the pin with the recess of the disc affixed perpendicular to the first output shaft and movable in a direction parallel with the first output shaft away from the gear carrier housing to disengage the pin from the recess of the disc affixed perpendicular to the first output shaft.

The locking actuator assembly may further include a servo motor disposed within the outer housing and operatively coupled with the locking ring to controllably move the locking ring in a direction parallel with the first output shaft toward and away from the gear carrier housing.

The servo motor may include a servo shaft disposed about perpendicular to the first output shaft, the locking actuator assembly may further include a fork affixed to the servo shaft to rotate in a same direction as the servo shaft, and the fork may controllably move the locking ring toward and away from the gear carrier housing according to a direction of rotation of the servo shaft.

The locking differential apparatus may further include a ring gear disposed within the outer housing, wherein the gear carrier housing is affixed on one side to the ring gear. The gear carrier housing may rotate synchronously with the ring gear on a same axis of rotation. The gear carrier housing may have an external wall parallel to the ring gear on an opposite side of the differential gear carrier from the ring gear. The locking differential apparatus may further include a first internal gear disposed within the differential gear carrier, wherein the first internal gear is affixed to the first output shaft. The first internal gear may rotate synchronously with the first output shaft on a same axis of rotation. The first internal gear may be disposed parallel to the ring gear and proximate the external wall on the opposite side of the differential gear carrier from the ring gear.

The locking differential apparatus may further include a second internal gear disposed within the differential gear carrier, wherein the second internal gear is affixed to the second output shaft and rotates synchronously with the second output shaft on a same axis of rotation. The second internal gear may be disposed parallel to the ring gear and proximate the ring gear on a same side of the differential gear carrier as the ring gear. The locking differential apparatus may further include a planetary gear disposed within the differential gear carrier perpendicular to and operatively coupled with both the first internal gear and the second internal gear.

The disc may be integral with the first internal gear.

The first internal gear may be integral with the first output shaft.

The differential gear carrier may further include three bearings disposed between the gear carrier housing and the outer housing. A first bearing may be disposed proximate the first output shaft, a second bearing may be disposed proximate the second output shaft, and a third bearing may be disposed proximate the first internal gear between the first bearing and the second bearing.

The first internal gear may include a flange that seals the side of the first internal gear adjacent the external wall against the external wall.

The gear carrier housing may include seals that prevent oil within the gear carrier housing from leaking outside of the gear carrier housing.

According to another embodiment, a locking differential gear carrier includes a gear carrier housing, a first output shaft disposed at least partially within the gear carrier housing, and an internal gear affixed perpendicular to the first output shaft to rotate synchronously with the first output shaft and disposed within the gear carrier housing. The internal gear has a recess configured to engage with a pin. The locking differential gear carrier also includes a second output shaft disposed at least partially within the gear carrier housing. The first output shaft and the second output shaft are differentially linked by the differential gear carrier to maintain a constant relationship between a rotation rate of the gear carrier housing and the average rotation rate of the first output shaft and the second output shaft while the second output shaft rotates at a variable rate different from a rotation rate of the first output shaft. The locking differential gear carrier also includes a locking actuator assembly disposed exterior to the gear carrier housing. The locking actuator assembly includes a pin disposed in parallel with the first output shaft and passing through the gear carrier housing to selectively engage with the recess of the internal gear to lock the first output shaft to the gear carrier housing and cause the first output shaft and the second output shaft to rotate synchronously. The locking actuator assembly also includes a locking ring disposed exterior to the gear carrier housing, the pin affixed to the locking ring, the locking ring movable in a direction parallel with the first output shaft toward the gear carrier housing to engage the pin with the recess of the internal gear, and movable in a direction parallel with the first output shaft away from the gear carrier housing to disengage the pin from the recess of the internal gear. The locking actuator assembly further includes a servo motor disposed exterior to the gear carrier housing and operatively coupled with the locking ring to controllably move the locking ring in a direction parallel with the first output shaft toward and away from the gear carrier housing.

The servo motor may include a servo shaft disposed about perpendicular to the first output shaft. The locking actuator assembly may further include a fork affixed to the servo shaft to rotate in a same direction as the servo shaft. The fork may controllably move the locking ring toward and away from the gear carrier housing according to a direction of rotation of the servo shaft.

The locking differential gear carrier may further include a ring gear affixed on one side to the gear carrier housing, wherein the gear carrier housing rotates synchronously with the ring gear on a same axis of rotation. The gear carrier housing may have an external wall parallel to the ring gear on an opposite side of the differential gear carrier from the ring gear, wherein the first internal gear is disposed parallel to the ring gear and proximate the external wall on the opposite side of the differential gear carrier from the ring gear.

The locking differential gear carrier may further include a second internal gear disposed within the differential gear carrier, wherein the second internal gear is affixed to the second output shaft and rotates synchronously with the second output shaft on a same axis of rotation. The second internal gear may be disposed parallel to the ring gear and proximate the ring gear on a same side of the differential gear carrier as the ring gear. The locking differential gear carrier may also include a planetary gear disposed within the differential gear carrier perpendicular to and operatively coupled with both the first internal gear and the second internal gear.

The first internal gear may be integral with the first output shaft.

The differential gear carrier may further include three bearings disposed between the gear carrier housing and the outer housing, a first bearing disposed proximate the first output shaft, a second bearing disposed proximate the second output shaft, and a third bearing disposed proximate the first internal gear between the first bearing and the second bearing.

The first internal gear may include a flange that seals the side of the first internal gear adjacent the external wall against the external wall.

The gear carrier housing may include seals that prevent oil within the gear carrier housing from leaking outside of the gear carrier housing.

BRIEF DESCRIPTION OF THE DRAWINGS

Features and advantages of this disclosure will become apparent in review of exemplary embodiments with reference to the attached drawings, in which:

FIG. 9 is an exploded view that illustrates the assembly of the differential gear carrier of the locking differential apparatus of FIGS. 1 and 2 with the locking ring, the locking fork, and the locking actuator, according to an embodiment;

DETAILED DESCRIPTION

Figure 1:
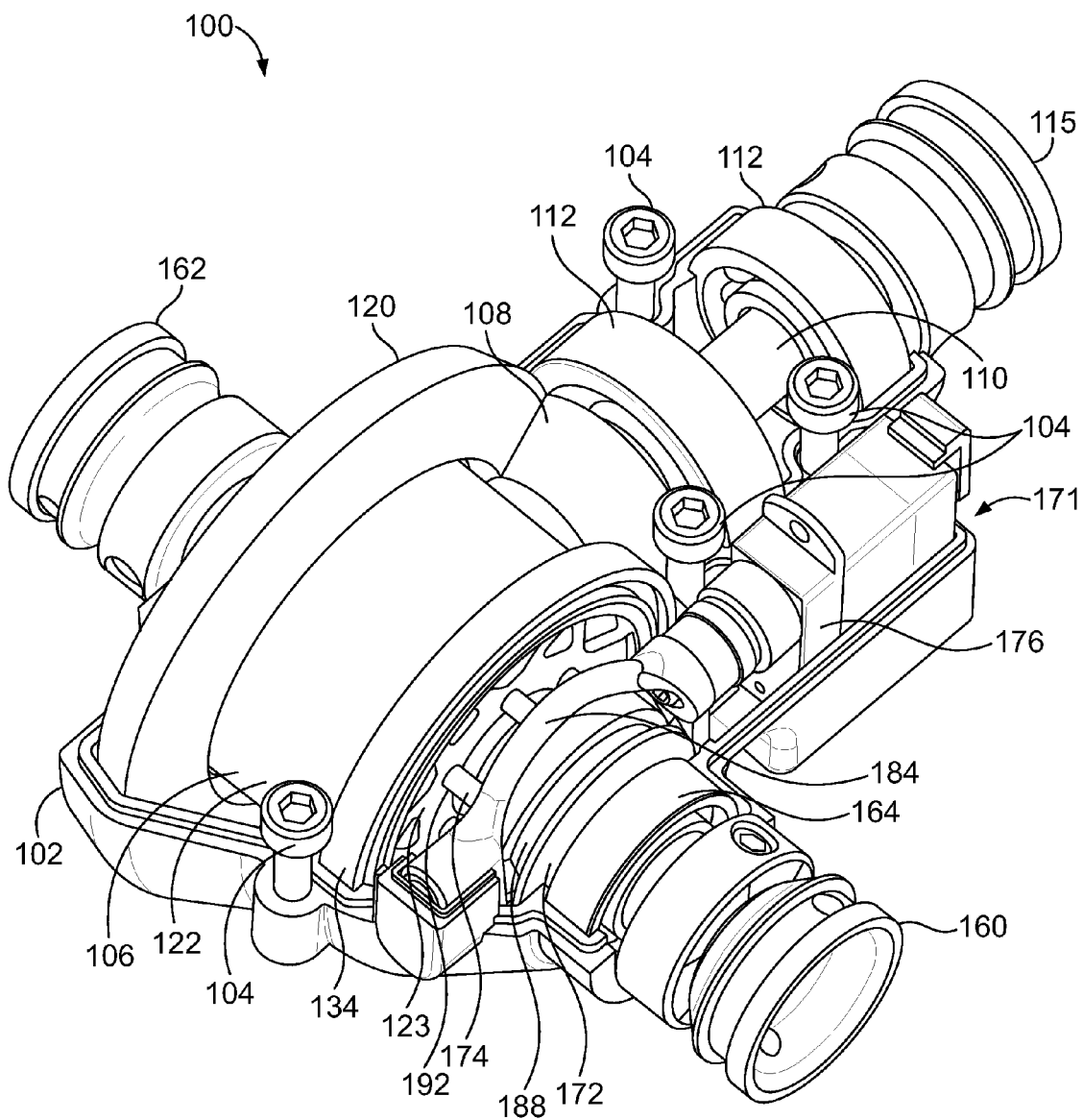
FIG. 1 is a perspective view that illustrates a locking differential apparatus in an unlocked position, according to an embodiment.
Figure 2:
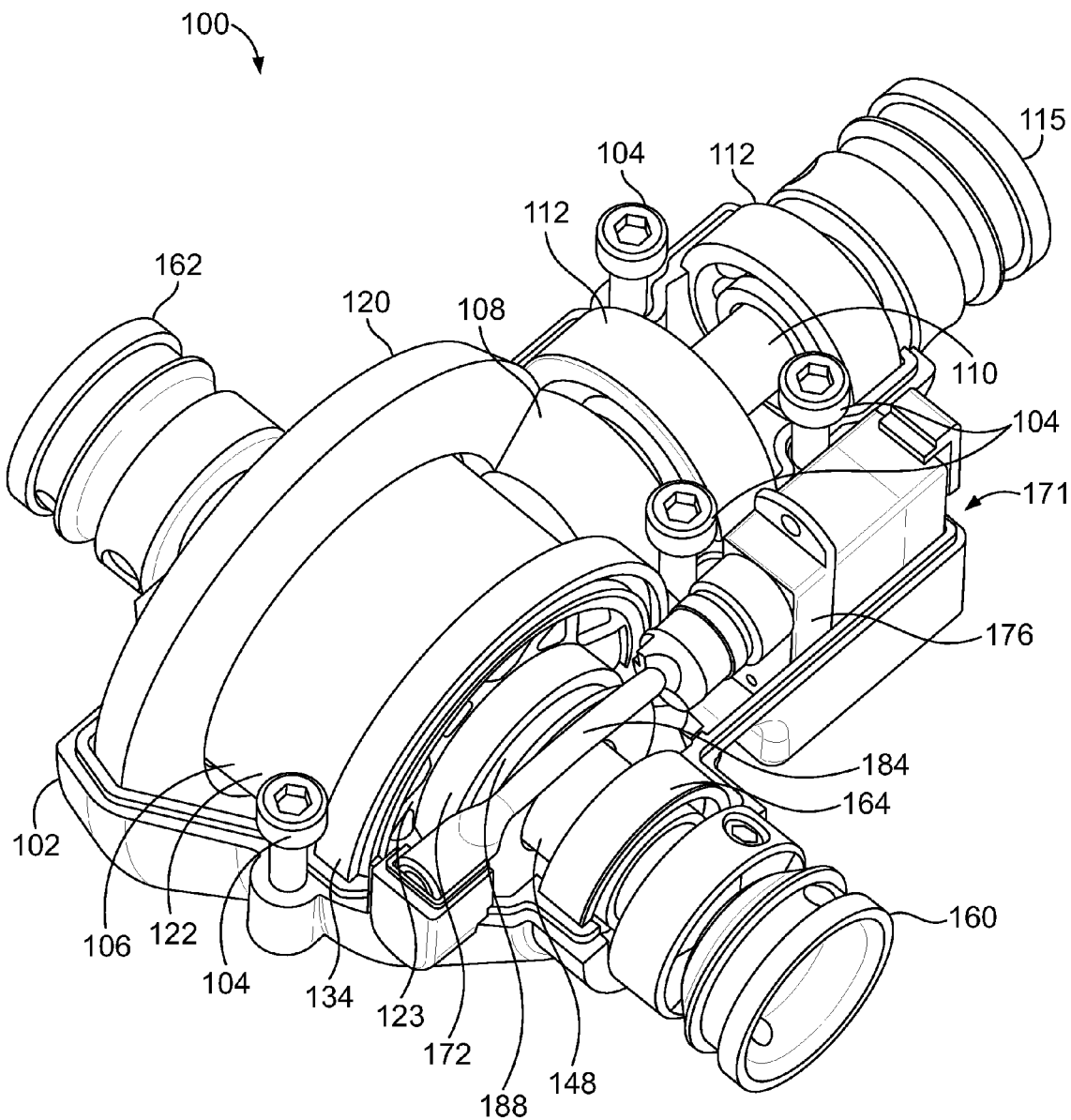
FIG. 2 is a perspective view that illustrates the locking differential apparatus of FIG. 1 in a locked position, according to an embodiment.
Figure 3:
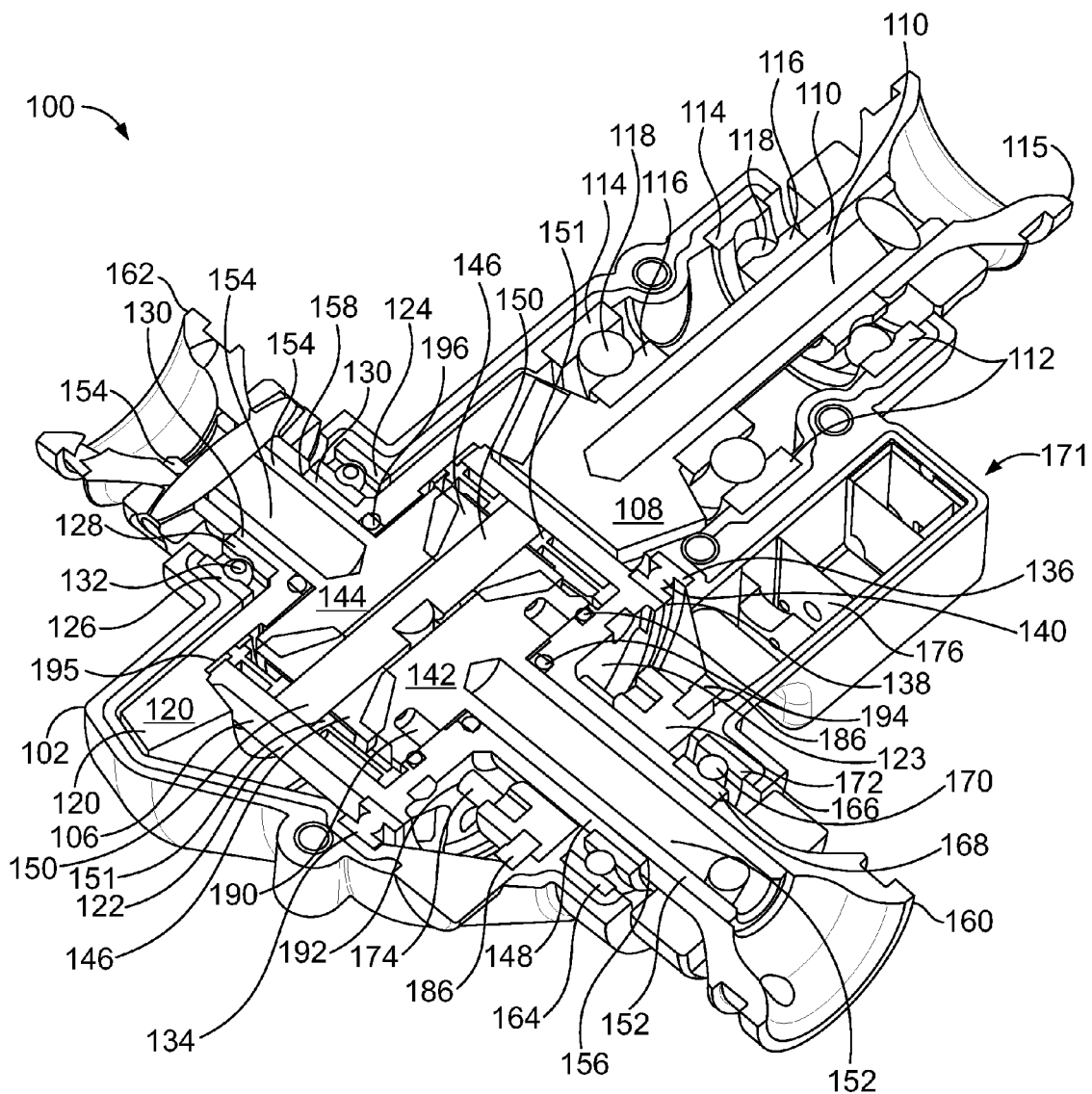
FIG. 3 is a perspective view that illustrates a cross-section of the locking differential apparatus of FIG. 1 in the unlocked position, according to an embodiment.
Figure 4:
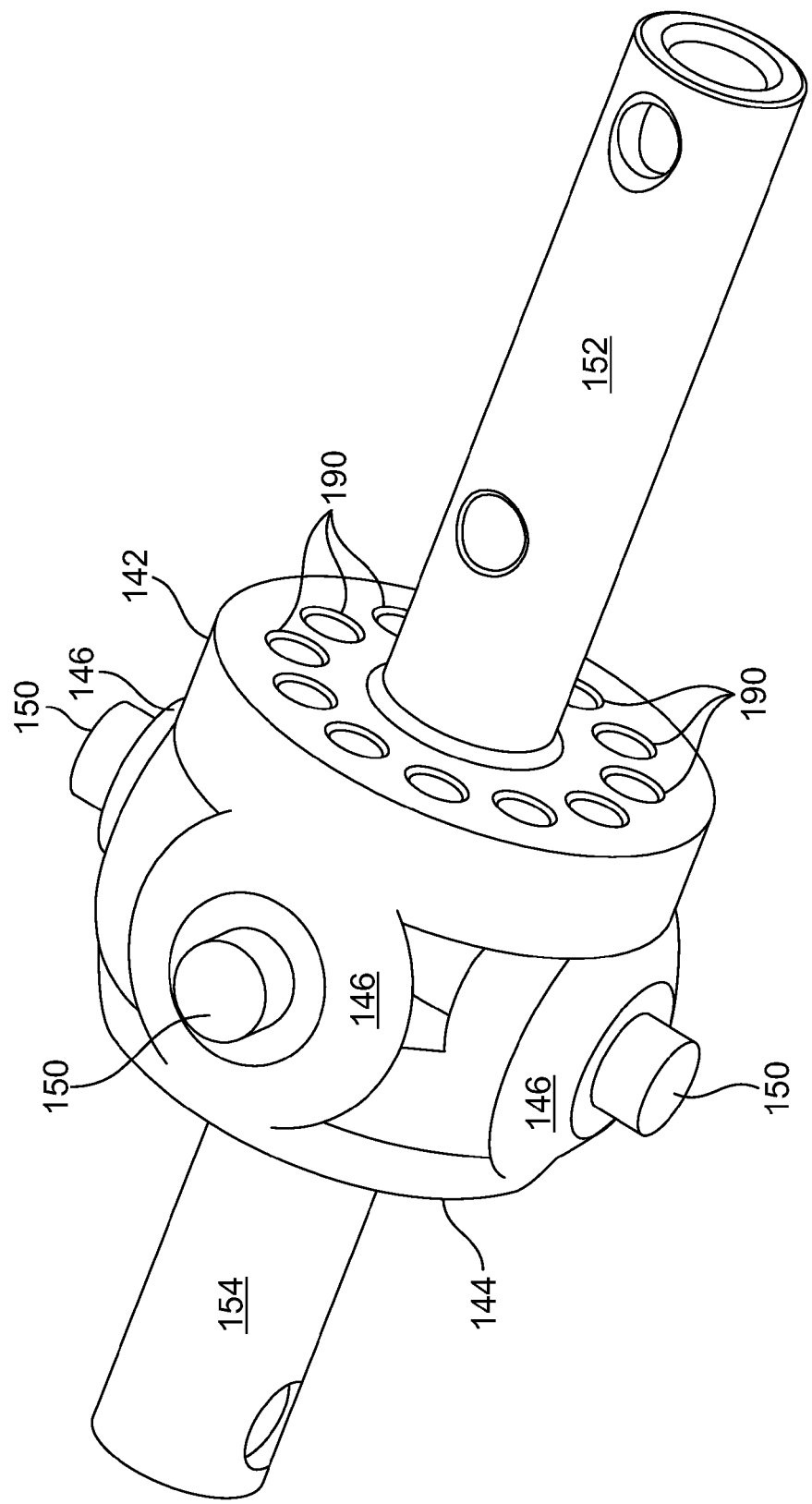
FIG. 4 is a perspective view that illustrates the gear assembly within the locking differential gear carrier of the locking differential apparatus of FIGS. 1 and 2, according to an embodiment.
Figure 6:
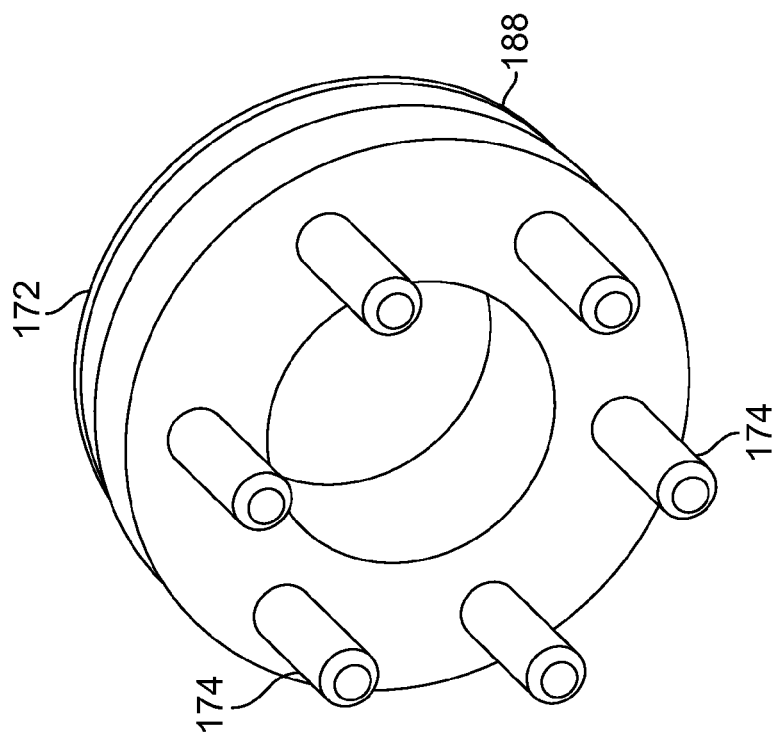
FIG. 6 is a perspective view that illustrates the locking ring of the locking differential apparatus of FIGS. 1 and 2, according to an embodiment.
Figure 5:
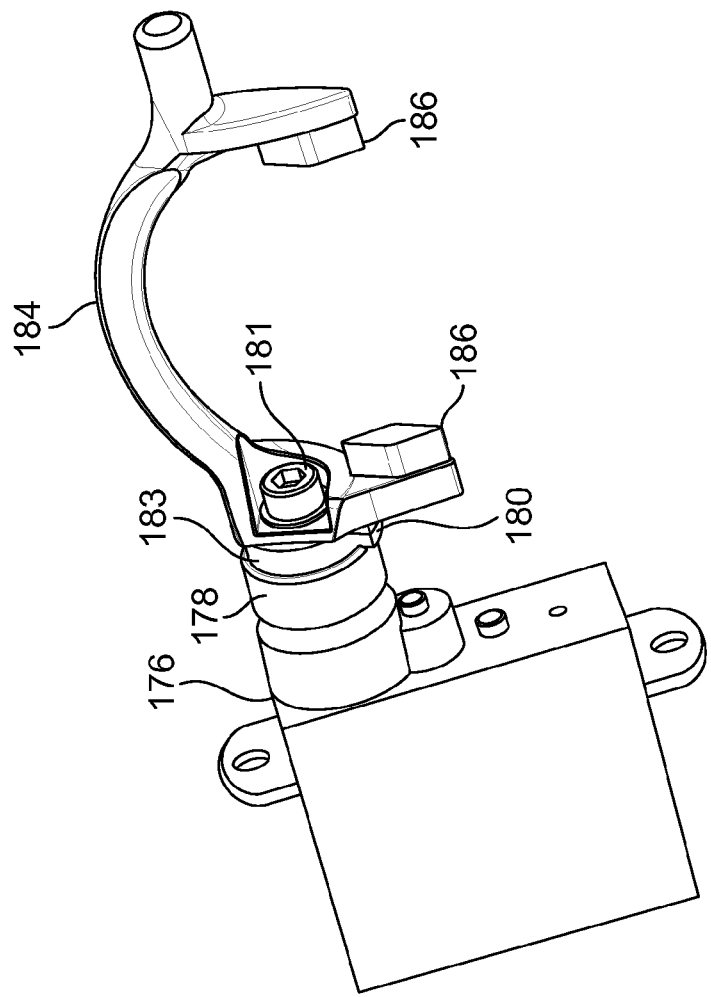
FIG. 5 is a perspective view that illustrates the locking actuator and locking fork of the locking differential apparatus of FIGS. 1 and 2, according to an embodiment.
Figure 8:
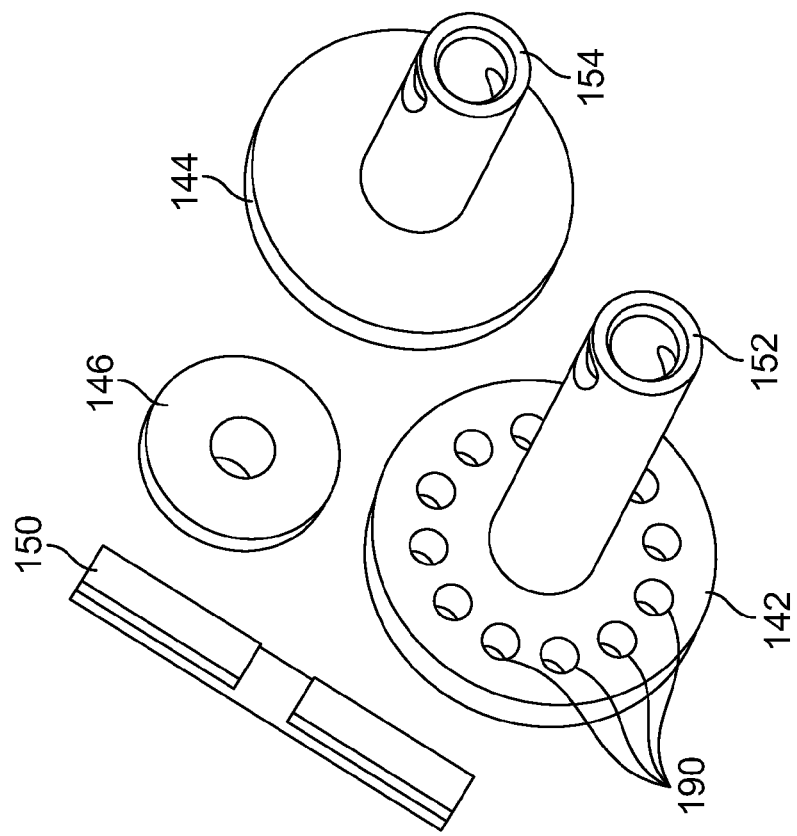
FIG. 8 is a perspective view that illustrates internal gears and axle of the gear carrier housing of the locking differential apparatus of FIGS. 1 and 2, according to an embodiment.
Figure 7:
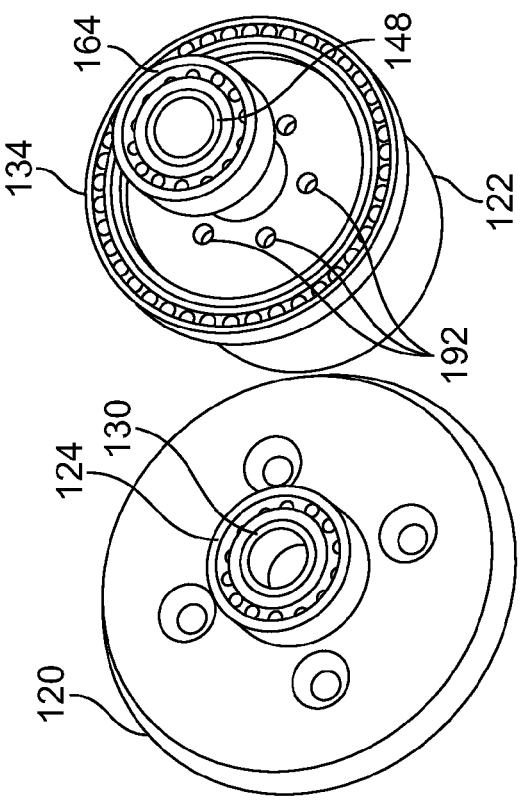
FIG. 7 is a perspective view that illustrates the exterior ends of the ring gear with the ring gear shaft and central gear carrier housing with the gear carrier housing shaft of the locking differential apparatus of FIGS. 1 and 2, according to an embodiment.
Figure 10A:
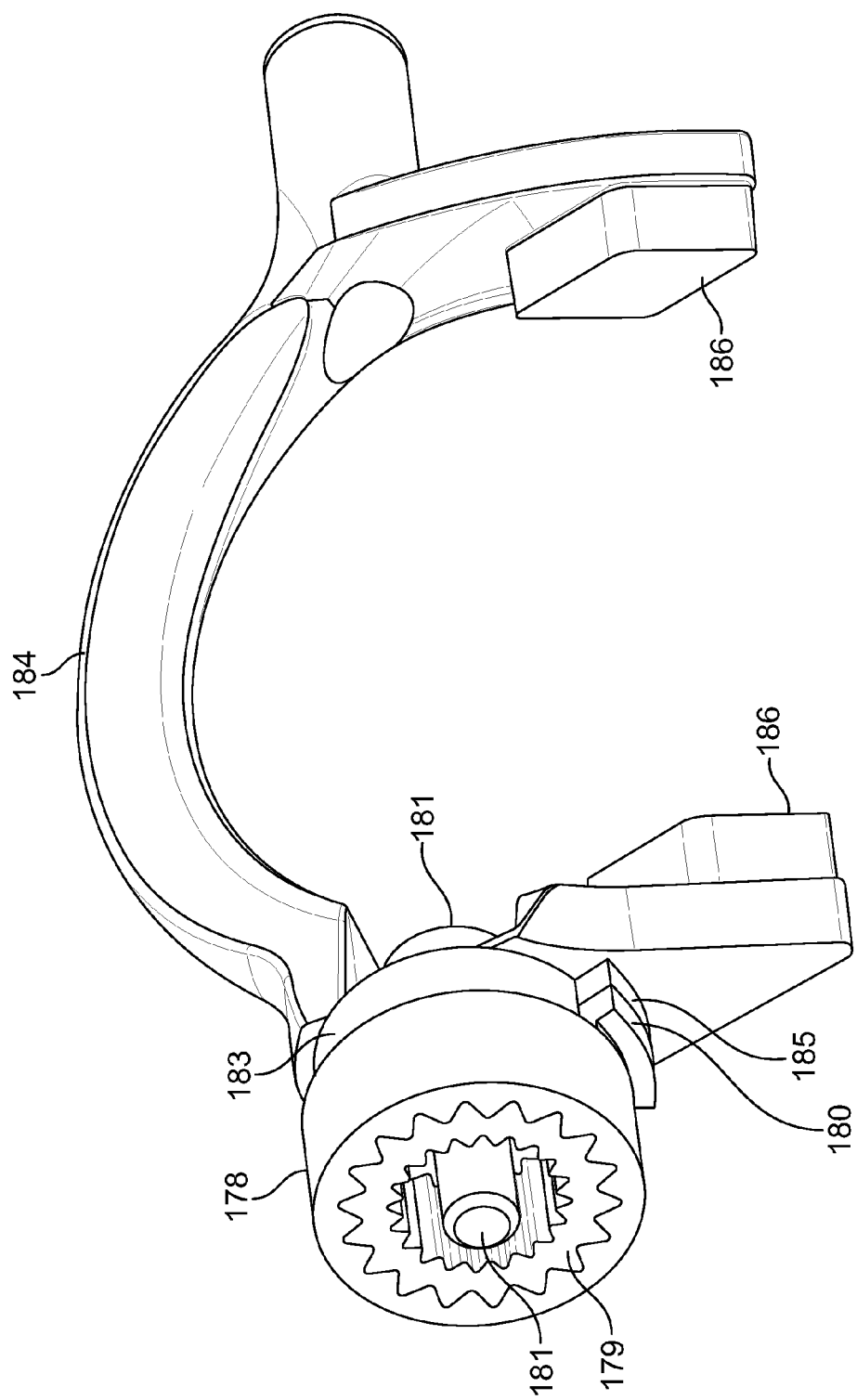
FIGS. 10A and 10B are perspective views that illustrate the assembly of the locking fork with the actuator saver of the locking differential apparatus of FIGS. 1 and 2, according to an embodiment.
Figure 10B:
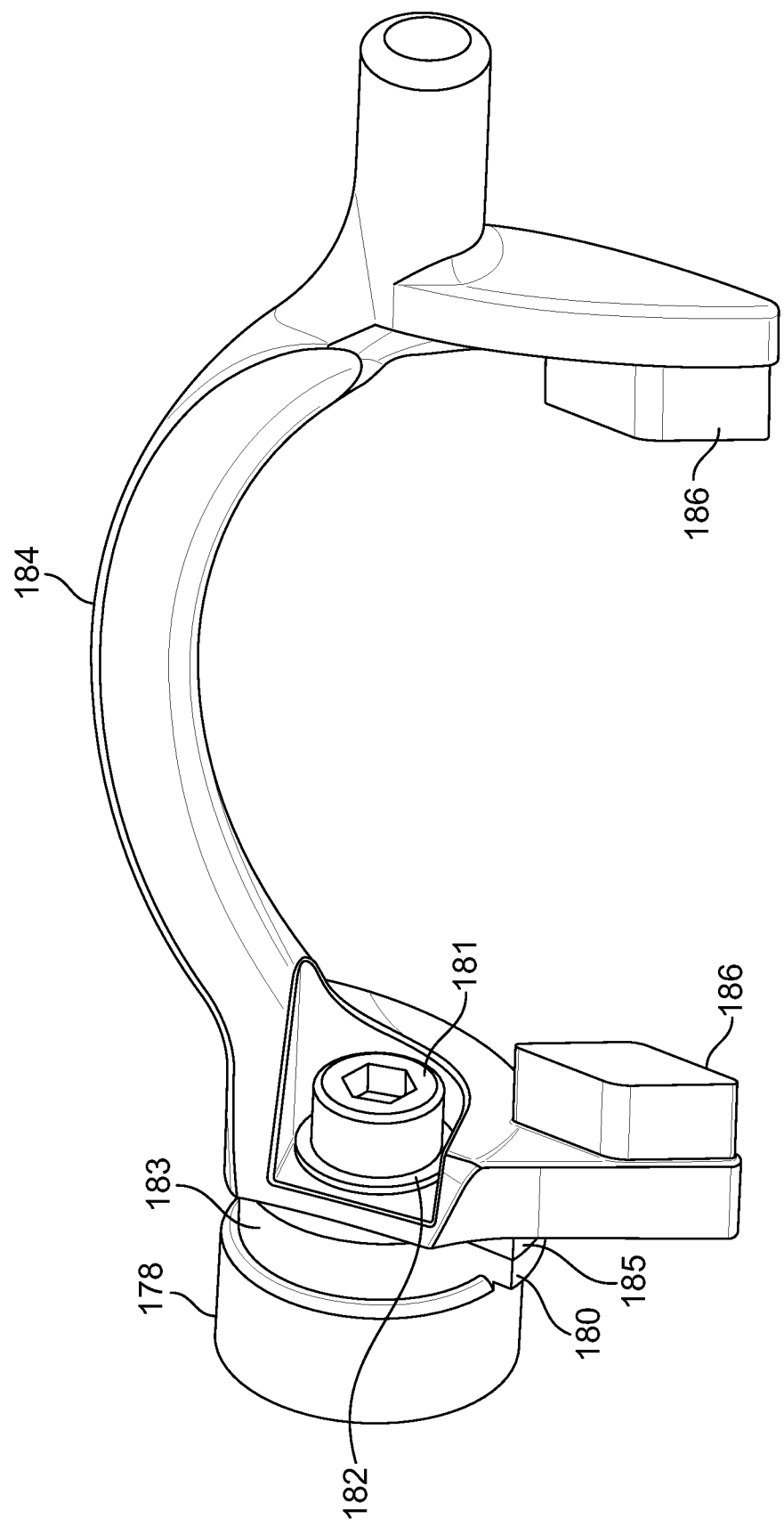
Figure 11A:
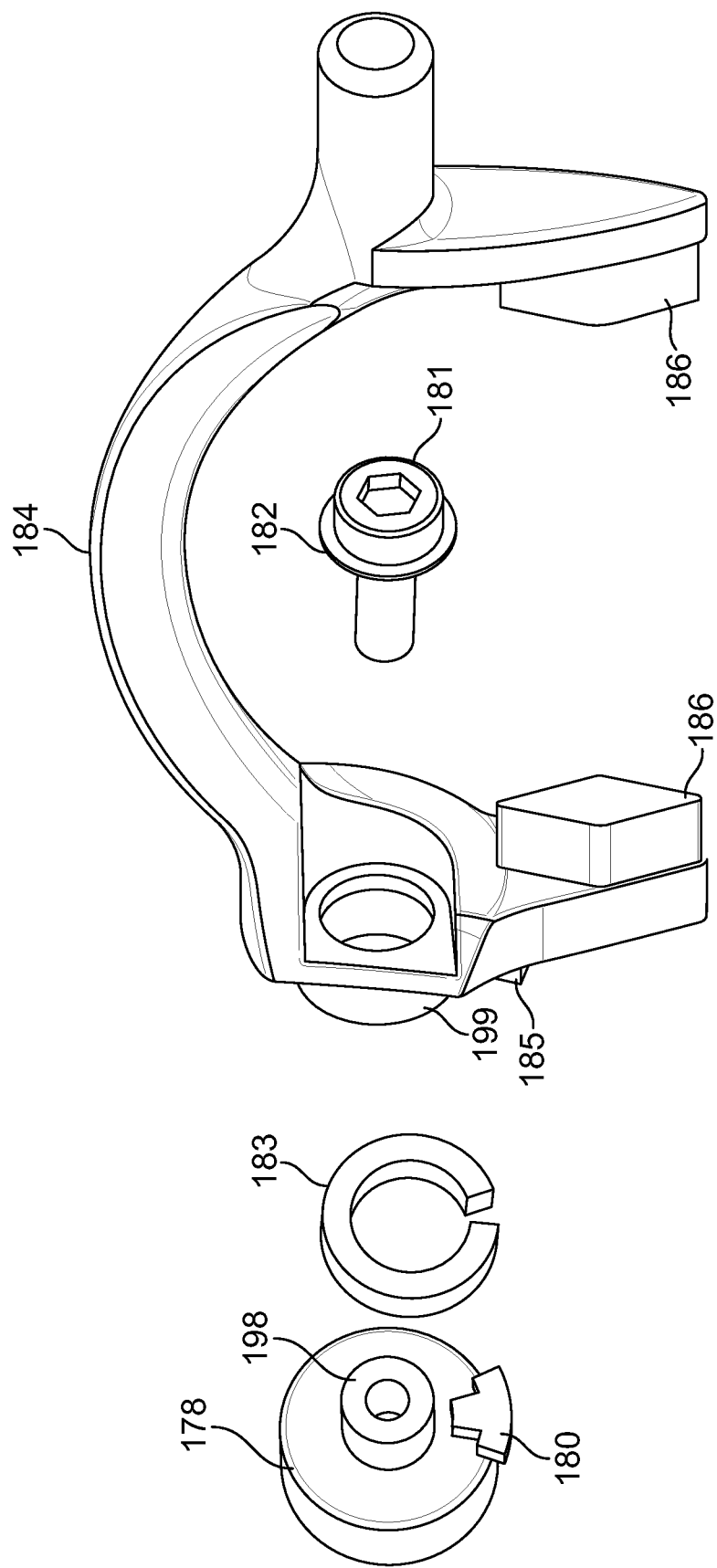
FIGS. 11A and 11B are exploded views that illustrate the assembly of the locking fork with the actuator saver of the locking differential apparatus of FIGS. 1 and 2, according to an embodiment.
Figure 11B:
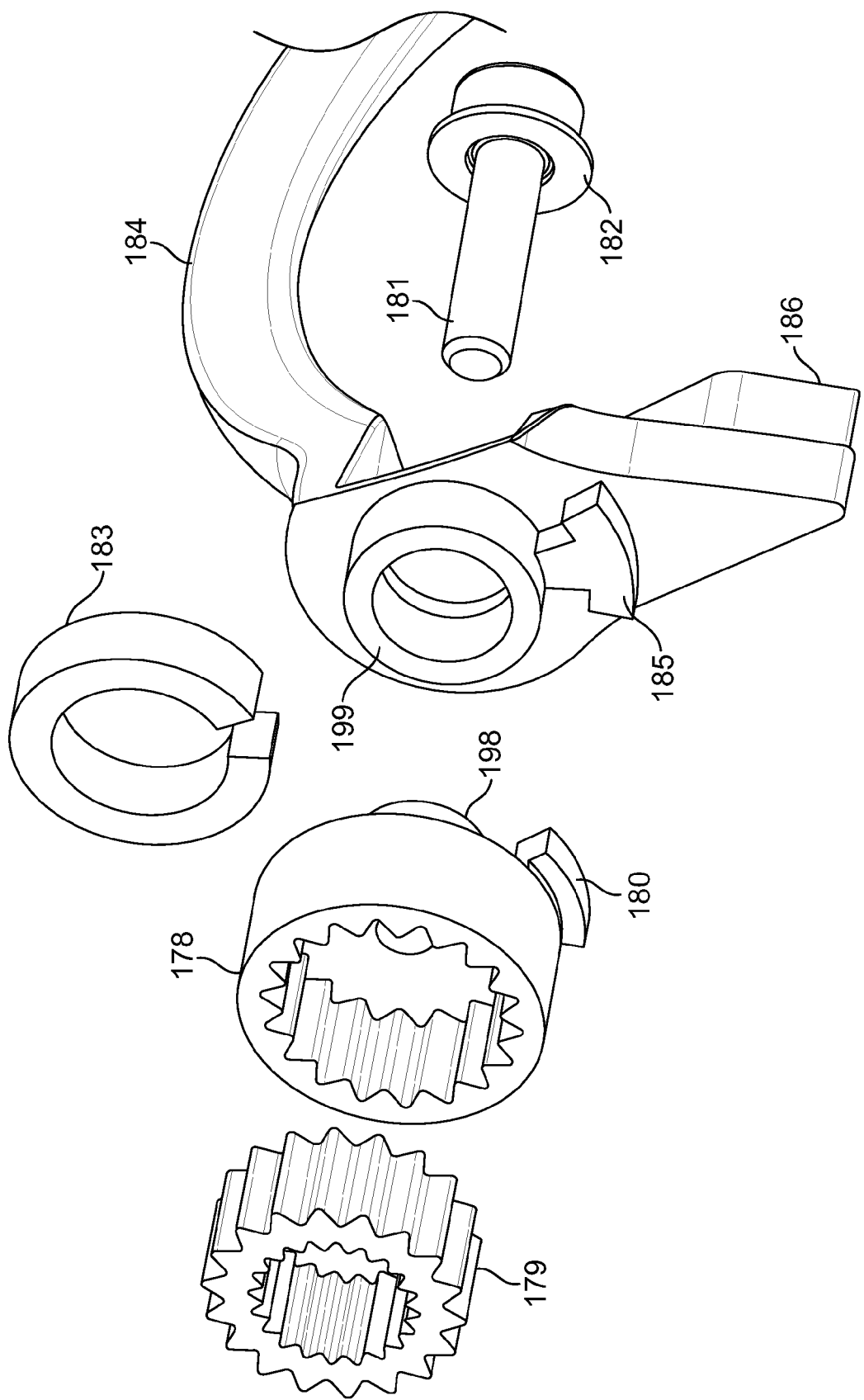

FIG. 1 is a perspective view that illustrates a locking differential apparatus 100 in an unlocked position, according to an embodiment. FIG. 2 is a perspective view that illustrates the locking differential apparatus 100 of FIG. 1 in a locked position, according to an embodiment. FIG. 3 is a perspective view that illustrates a cross-section of the locking differential apparatus 100 of FIG. 1 in the unlocked position, according to an embodiment. FIG. 4 is a perspective view that illustrates the gear assembly within the locking differential gear carrier of the locking differential apparatus of FIGS. 1 and 2, according to an embodiment. FIG. 5 is a perspective view that illustrates the locking actuator 176 and locking fork 184 of the locking differential apparatus 100 of FIGS. 1 and 2, according to an embodiment. FIG. 6 is a perspective view that illustrates the locking ring 172 of the locking differential apparatus 100 of FIGS. 1 and 2, according to an embodiment. FIG. 7 is a perspective view that illustrates the exterior ends of the ring gear 120 with the ring gear shaft 130 and central gear carrier housing 122 with the gear carrier housing shaft 148 of the locking differential apparatus 100 of FIGS. 1 and 2, according to an embodiment. FIG. 8 is a perspective view that illustrates internal gears and axles of the differential gear carrier 106 of the locking differential apparatus 100 of FIGS. 1 and 2, according to an embodiment. FIG. 9 is an exploded view that illustrates the assembly of the differential gear carrier 106 of the locking differential apparatus 100 of FIGS. 1 and 2 with the locking ring 172, the locking fork 184, and the locking actuator 176, according to an embodiment. FIGS. 10A and 10B are perspective views that illustrate the assembly of the locking fork 184 with the actuator saver 178 of the locking differential apparatus 100 of FIGS. 1 and 2, according to an embodiment. FIGS. 11A and 11B are exploded views that illustrate the assembly of the locking fork 184 with the actuator saver 178 of the locking differential apparatus 100 of FIGS. 1 and 2, according to an embodiment. Note that while teeth of gears and thread of screws and bolts may not be explicitly shown in illustrations of the embodiments, one of ordinary skill in the art would understand where teeth of such gears and thread of such screws would be present and how such teeth of gears would be structurally provided to cause gears shown as interlocking to interlock and how such thread of screws and bolts would be structurally provided to cause screws and bolts shown as fastening objects to fasten such objects.

The locking differential apparatus 100 includes an outer housing 102 which houses the components of the locking differential apparatus 100. As illustrated, the bottom of the outer housing 102 is shown, while the top of the outer housing 102 that mates with the bottom of the outer housing 102 is not shown. Multiple bolts 104 bolt the top and bottom of the outer housing 102 together to contain and protect the components of the locking differential apparatus 100 from environmental hazards such as dust, dirt, moisture, debris, and other objects and contaminants that may interfere with proper operation of the locking differential apparatus 100.

A differential gear carrier 106 is disposed within the outer housing 102. The differential gear carrier 106 is driven by a drive gear 108 attached to a drive shaft 110. The drive shaft 110 is held in place by drive shaft supports 112 while the drive shaft 110 rotates and turns the drive gear 108. Each of the drive shaft supports 112 includes an outer support ring 114, an inner support ring 116, and bearings 118 disposed between the outer support ring 114 and the inner support ring 116 to facilitate smooth rotation of the drive shaft 110. An axis of rotation of the drive shaft 110 is substantially equal to an axis of rotation of the drive gear 108. In an embodiment, the drive shaft 110 and the drive gear 108 are integral with one another, but this should not be considered limiting. In various embodiments, the drive shaft 110 and the drive gear 108 may be separate components that are coupled with one another, for example by a screw, pin, rivet, bolt, weld, glue, or other fastener as known in the art. The outer end of the drive shaft 110 is covered by a drive shaft cover 115 where the drive shaft 110 exits the outer housing 102. A motor (not shown) may be coupled with the drive shaft 110 at the end of the draft shaft cover 115 to cause the drive shaft 110 to rotate and thereby drive the locking differential apparatus 100.

The drive gear 108 is operationally coupled with a ring gear 120 whereby teeth (not shown) of the drive gear 108 engage with teeth (not shown) of the ring gear 120. Both the ring gear 120 and the drive gear 108 are bevel gears, where the axes of rotation of the ring gear 120 and the drive gear 108 intersect and tooth-bearing faces of the ring gear 120 and the drive gear 108 are conically shaped. The ring gear 120 is attached to a central gear carrier housing 122 of the differential gear carrier 106 that rotates synchronously with the ring gear 120, along a same axis of rotation. Through the interface of the drive gear 108 and the ring gear 120, rotation of the drive shaft 110 causes the central gear carrier housing 122 of the differential gear carrier 106 to rotate along an axis substantially perpendicular to the axis of rotation of the drive shaft 110.

The combination of the ring gear 120 and the central gear carrier housing 122 are held in place within the outer housing 102 by three supports having bearings: a ring gear support 124, a central gear carrier support 134, and a gear carrier housing shaft support 164. The ring gear support 124 includes an outer support ring 126 affixed to the interior of the outer housing 102, an inner support ring 128 affixed to a ring gear shaft 130, and bearings 132 disposed between the outer support ring 126 and the inner support ring 128 to facilitate smooth rotation of the ring gear shaft 130 and the ring gear 120 coupled with the central gear carrier housing 122. The central gear carrier support 134 includes an outer support ring 136 affixed to the interior of the outer housing 102, an inner support ring 138 affixed to a curved exterior of the central gear carrier housing 122 on an end opposite the end of the central gear carrier housing 122 affixed to the ring gear 120, and bearings 140 disposed between the outer support ring 136 and the inner support ring 138 to facilitate smooth rotation of the central gear carrier housing 122. The gear carrier housing shaft support 164 includes an outer support ring 166, an inner support ring 168, and bearings 170 disposed between the outer support ring 166 and the inner support ring 168 to facilitate smooth rotation of a gear carrier housing shaft 148 coupled with the central gear carrier housing 122. The gear carrier housing shaft 148 in turn facilitates smooth rotation of the first output shaft 152.

Disposed within the central gear carrier housing 122, the differential gear carrier 106 includes a first interior gear 142, a second interior gear 144, four planetary gears 146, and two central planetary shafts 150 crossing one another at the center of the differential gear carrier 106 that affix the planetary gears 146 adjacent to an interior side of a curved wall of the central gear carrier housing 122. The number of planetary gears 146 and planetary shafts 150 described should not be construed as limiting, as in various embodiments, there may be different numbers of planetary gears 146 and planetary shafts 150. Shaft inserts 151 hold the central planetary shafts 150 in place against the curved wall of the central gear carrier housing 122. The first interior gear 142 is coupled with a first output shaft 152 such that an axis of rotation of the first interior gear 142 is the same as an axis of rotation of the first output shaft 152. As illustrated, the first interior gear 142 and the first output shaft 152 are integral with one another, but this should not be construed as limiting, as in various embodiments, the first interior gear 142 and the first output shaft 152 may be separate components fixedly coupled with one another in other ways as known in the art and discussed elsewhere herein such that when the differential gear carrier 106 causes the first interior gear 142 to rotate, the first output shaft 152 is in turn caused to rotate. The illustrated integration of the first interior gear 142 and the first output shaft 152 facilitates better gear meshing control and better centering of the first output shaft 152 with the first interior gear 142 relative to the non-integral alternative approaches. Therefore, the integral design of the first interior gear 142 and the first output shaft 152 provides better gear support and meshing precision to increase torque transmission capacity, increasing the strength, durability, and longevity of the differential gear carrier 106 and its constituent components. The second interior gear 144 is coupled with a second output shaft 154 in a manner similar to that described above with respect to the first interior gear 142 and the first output shaft 152 to cause the second output shaft 154 to rotate when the differential gear carrier 106 causes the second interior gear 144 to rotate.

Each of the first interior gear 142, the second interior gear 144, and the planetary gears 146 are bevel gears. The first interior gear 142 is operatively coupled with each of the planetary gears 146 by teeth (not shown) of the first interior gear 142 engaging with teeth (not shown) of the planetary gears 146. The second interior gear 144 is also operatively coupled with the planetary gears 146 by teeth (not shown) of the second interior gear 144 engaging with teeth (not shown) of the planetary gears 146. The axis of rotation of two of the planetary gears 146 are the same, which is along a length of a first central planetary shaft 150 around which both of these two planetary gears 146 rotate, while the axis of rotation of the other two of the planetary gears 146 is along a length of a second central planetary shaft 150 around which both of these other two planetary gears 146 rotate. The planetary gears 146 are disposed equidistant from one another along the curved wall of the interior of the central gear carrier housing 122, separated by the first interior gear 142 and the second interior gear 144 which engage the teeth (not shown) of each of the planetary gears 146 such that an axis of rotation of the first interior gear 142 and the second interior gear 144 is about perpendicular to the axis of rotation of the planetary gears 146.

When the central gear carrier housing 122 rotates within the outer housing 102, and the loads on the first output shaft 152 and second output shaft 154 are essentially equal, end-over-end rotation of the central planetary shafts 150 causes the non-rotating planetary gears 146 to cause the first interior gear 142 and second interior gear 144 to rotate at an equal angular velocity. When there is a difference in the loads on the first output shaft 152 and second output shaft 154, for example, when an interior wheel of a turning vehicle is attached to the first output shaft 152 and an exterior wheel of a turning vehicle is attached to the second output shaft 154 such that the exterior wheel has a greater distance to travel in completing the turn than the interior wheel, the differential gear carrier 106 performs a differential function. In performing the differential function, the two planetary gears 146 disposed on opposite ends of each central planetary shaft 150 rotate in opposite directions to allow the first interior gear 142 and the second interior gear 144 to equalize their torque by rotating at different angular velocities while maintaining an average angular velocity that directly corresponds to the angular velocity of the drive gear 108. Gearing ratios of the various gears in the locking differential apparatus 100 may be set to cause the average angular velocity of the first interior gear 142 and the second interior gear 144 to be equal to, or a constant multiple of, the angular velocity of the drive gear 108.

The first output shaft 152 exits the central gear carrier housing 122 through a gear carrier housing shaft 148 and a first output shaft opening 156 on a side of the central gear carrier housing 122 opposite the side affixed to the ring gear 120. The second output shaft 154 exits the central gear carrier housing 122 through a second output shaft opening 158 in the center of the ring gear shaft 130 of the ring gear 120. The outer end of the first output shaft 152 is covered by a first output shaft cover 160 where the first output shaft 152 exits the outer housing 102. The outer end of the second output shaft 154 is covered by a second output shaft cover 162 where the second output shaft 154 exits the outer housing 102. The first output shaft 152 is held in place by the gear carrier housing shaft 148 which in turn is supported by the gear carrier housing shaft support 164. The gear carrier housing shaft support 164 facilitates smooth rotation of the gear carrier housing shaft 148 which rotates synchronously with the central gear carrier housing 122. The second output shaft 154 is held in place by the ring gear shaft 130 which in turn is supported by the ring gear support 124. The ring gear support 124 facilitates smooth rotation of the ring gear shaft 130 which rotates synchronously with the ring gear 120.

A wheel may be operatively coupled to each of the first output shaft 152 and the second output shaft 154, for example, via an axle. The wheels thus coupled to the locking differential apparatus 100 may be drive wheels of a vehicle, for example, a toy or scale model remote control car. In other embodiments, various other wheels, pulleys, gears, etc. as known in the art may be operatively coupled to each of the first output shaft 152 and the second output shaft 154, according to various potential applications of the locking differential apparatus 100.

The locking differential apparatus 100 includes a locking actuator assembly 171 disposed within the outer housing 102 and exterior to the central gear carrier housing 122. The locking actuator assembly 171 includes a locking actuator 176, an actuator shaft 177, an actuator saver 178, a locking fork 184, a locking ring 172, and locking pins 174. The locking ring 172 encircles the first output shaft 152 and is disposed substantially parallel with the first interior gear 142. The locking ring 172 includes a recess 188 that encircles the locking ring to facilitate engaging the locking ring 172 to move the locking ring 172 along a length of the first output shaft 152 toward and away from the central gear carrier housing 122. The locking ring 172 includes a plurality of locking pins 174 that are disposed substantially perpendicular to the locking ring 172 and the first interior gear 142, and substantially parallel with the first output shaft 152. The word "pin" as used herein should not be limited to the shapes or dimensions of the locking pins 174 as illustrated in the drawings, but rather should be broadly construed as referring to any protrusion of any dimension capable of performing the function of the locking pins 174 as described herein. The locking pins 174 are disposed to pass through holes 192 in the central gear carrier housing 122 into the interior of the differential gear carrier 106 and into recesses 190 of the first interior gear 142. When the locking pins 174 are engaged with the recesses 190, the locking pins 174 cause the first interior gear 142 to lock in place relative to the central gear carrier housing 122. This is shown in FIGS. 2 and 3. When the locking pins are disengaged from the recesses 190, the first interior gear 142 is free to rotate independently of the central gear carrier housing 122 according to the differential function of the differential gear carrier 106 described herein. This is shown in FIG. 1. When the first interior gear 142 is locked in place relative to the central gear carrier housing 122, each of the planetary gears 146 and second interior gear 144 are also effectively locked in place because of their operational coupling with the first interior gear 142, and the locking differential apparatus 100 is considered to be "locked." When the locking differential apparatus 100 is locked, the locking differential apparatus 100 does not provide a differential function, and the first output shaft 152 and second output shaft 154 rotate at a same angular velocity as one another, directly related to the angular velocity of the drive shaft 110 and directly related to the angular velocity of the central gear carrier housing 122, regardless of any differences between the load or torque on each of the first output shaft 152 and second output shaft 154.

While the illustration and accompanying description discloses that the recesses 190 are disposed in the first interior gear 142, this should not be construed as limiting. In other embodiments, the recesses 190 may be disposed in another disc proximate to the exterior wall 123 of the central gear carrier housing 122 and affixed to the first output shaft 152 to rotate synchronously with the first output shaft 152 in parallel with the first interior gear 142 in order to accomplish the same purpose as when the recesses 190 are disposed in the first interior gear 142.

The locking actuator 176 may include a servo motor, but this should not be construed as limiting, as other types of actuators as known in the art may be used in different embodiments. The locking actuator 176 is operatively coupled with an actuator shaft 177 that is rotated by the locking actuator 176. The actuator shaft 177 is disposed about perpendicular to the first output shaft 152, and rotates along an axis of rotation that is about perpendicular to the axis of rotation of the first output shaft 152.

An actuator saver 178 is mounted on and surrounds the actuator shaft 177. In the illustrated embodiment, the actuator saver 178 includes a double spline 179 at its center, which surrounds the actuator shaft 177 when the actuator saver 178 is mounted on the actuator shaft 177. The actuator saver 178 includes ridges surrounding a central void in which the double spline 179 is installed. The ridges surrounding the central void engage with corresponding ridges surrounding an exterior edge of the double spline 179 to hold the double spline 179 in place and prevent slipping between the double spline 179 and the actuator saver 178 when the actuator shaft 177 rotates. The double spline 179 also includes ridges on an interior edge that engage with the exterior edge of the actuator shaft 177. The actuator shaft 177 may include ridges on the exterior edge that engage with the double spline 179's ridges. Although the actuator saver 178 is illustrated and described as including the double spline 179, this should not be construed as limiting. In other embodiments, the actuator saver 178 may not include the double spline 179, and may interface directly with the actuator shaft 177 without a double spline 179 disposed therebetween. Further, as one of ordinary skill in the art would recognize, a size and shape of the opening in the middle of the actuator saver 178 and a size and shape of the actuator shaft 177 may be different than illustrated in various other embodiments while facilitating the actuator shaft 177 engaging the actuator saver 178 to turn the locking fork 184 when the actuator shaft 177 turns.

The actuator saver 178 is attached to the locking fork 184 on an opposite side of the actuator saver 178 relative to the locking actuator 176 as illustrated in FIGS. 9, 10A, 10B, 11A, and 11B. The locking fork 184 rotates along a same axis of rotation as the actuator shaft 177. The actuator saver 178 includes an actuator saver key protrusion 180 that aligns with a corresponding locking fork key protrusion 185 on the locking fork 184. A saver sleeve protrusion 198 of the actuator saver 178 proximate the actuator saver key protrusion 180 through which a screw 181 is inserted fits into a larger fork sleeve protrusion 199 of the locking fork 184 proximate the locking fork key protrusion 185. An end of the fork sleeve protrusion 199 nestles between the saver sleeve protrusion 198 and the actuator saver key protrusion 180.

In the illustrated embodiment, an actuator saver spring 183 is positioned along an exterior of the fork sleeve protrusion 199 in which the saver sleeve protrusion 198 is inserted to hold them in relative position to one another in conjunction with the actuator saver key protrusion 180 that aligns with the corresponding locking fork key protrusion 185. The actuator saver spring 183 may be an embodiment of a spring ring. The combination of the actuator saver key protrusion 180 and the locking fork key protrusion 185 fit within a slot or opening in the actuator saver spring 183. Therefore, the actuator saver spring 183 prevents the actuator saver 178 and the locking fork 184 from rotating relative to one another. Although the actuator saver 178 is illustrated and described as including the actuator saver spring 183, this should not be construed as limiting. In other embodiments, the actuator saver 178 may not include the actuator saver spring 183, and may include other structure for holding the actuator saver 178 and the locking fork 184 in relative position with one another. For example, the actuator saver 178 may include a torsion spring that holds the actuator saver 178 and the locking fork 184 in relative position with one another in an embodiment. Further, as one of ordinary skill in the art would recognize, a size and shape of the actuator saver key protrusion 180 and a size and shape of the locking fork key protrusion 185 may be different than illustrated in various other embodiments while facilitating the actuator saver 178 engaging with the locking fork 184 to maintain relative position with one another when the actuator shaft 177 turns.

The locking fork 184 is affixed to the actuator saver 178 and the actuator shaft 177 by the screw 181. In an embodiment, the screw 181 may fasten the locking fork 184 to an end of the actuator shaft 177 with the actuator saver 178 in between. In another embodiment, the screw 181 may fasten the locking fork 184 to the actuator saver 178 using threads on an interior side of the saver sleeve protrusion 198. In another embodiment, the screw 181 may fasten the locking fork 184 to both the end of the actuator shaft 177 and the saver sleeve protrusion 198 of the actuator saver 178. A flat washer 182 is disposed between the screw 181 and the fork sleeve protrusion 199 through which the screw 181 passes to reach the saver sleeve protrusion 198. The locking fork 184 may be affixed to the actuator shaft 177 by other types of fasteners and structures as known in the art in various embodiments, for example, a pin, a compression cap, a rivet, or a nut, such that when the actuator shaft 177 rotates, the locking fork 184 rotates.

The double spline 179 may be made of a pliant material such as rubber that facilitates the actuator saver 178 having a strong grip on the actuator shaft 177. The material of the double spline 179 may provide a friction-based grip to hold the actuator saver 178 in place on the actuator shaft 177. The material of the double spline 179 may also provide a dampening effect on vibration and shock from operation of the locking fork 184 and locking ring 172 in order to prevent damage to the locking actuator 176. For example, the locking actuator may rotate the actuator shaft 177 to lock the differential gear carrier 106 at a time when the locking pins 174 are not aligned with the holes 192. The pliant double spline 179 may then compress like a spring to later provide a motive force to cause the locking ring 172 to insert the locking pins 174 into the holes 192 when the holes 192 are in position to facilitate entry by the locking pins 174 while allowing the actuator shaft 177 to at least partially move into the locked position even though the locking ring 172 is not yet able to move into the locked position. Then, when the holes 192 are in position to facilitate entry by the locking pins 174, the pliant double spline 179 may decompress and provide the motive force to cause the locking ring 172 to insert the locking pins 174 into the holes 192. As such, the timing of motion of the actuator shaft 177 from an unlocked position to a locked position and the timing of motion of the locking ring 172 from an unlocked position to a locked position may be asynchronous to account for uncertainty in the precise moment when the locking pins 174 are aligned with the holes 192. In embodiments in which the actuator saver 178 does not include a separate double spline 179, characteristics described with reference to the double spline 179 herein may be descriptive of the structure of the actuator saver 178.

The locking fork 184 includes two levers 186 that engage with the recess 188 on two sides of the locking ring 172. Because the recess 188 is circular, the levers 186 may remain stationary within the recess 188 while the locking ring 172 rotates along with the central gear carrier housing 122 relative to the locking fork 184. When the actuator shaft 177 rotates the locking fork 184 in one direction, the levers 186 cause the locking ring 172 to push the locking pins 174 into the central gear carrier housing 122 and recesses 190 of the first interior gear 142 in order to lock the first interior gear 142 to the central gear carrier housing 122. When the actuator shaft 177 rotates the locking fork 184 in an opposite direction, the levers 186 cause the locking ring 172 to pull the locking pins 174 at least partially out of the central gear carrier housing 122 and fully out of the recesses 190 of the first interior gear 142 in order to free the first interior gear 142 to rotate according to the differential function of the differential gear carrier 106.

The central gear carrier housing 122 is sealed to prevent lubricating oil from leaking from the interior of the central gear carrier housing 122. Ring seals, for example, x-ring, o-ring, and square ring seals, are used to effectively seal openings through which shafts and pins pass through the wall 123 of the central gear carrier housing 122. This is accomplished by a pair of ring seals 194 disposed on an interior side of the wall 123 of the central gear carrier housing 122 between the central gear carrier housing 122 and the first interior gear 142. The pair of ring seals 194 encirle the group of holes 192 through which the locking pins 174 pass to prevent lubricating oil from reaching the group of holes 192. One ring seal 194 is disposed adjacent to the first output shaft 152 proximate where the first output shaft 152 meets the first interior gear 142 to form a seal between the interior of the wall 123 and the first output shaft 152. The other ring seal 194 is disposed on an opposite side of the group of holes 192 and adjacent to the first interior gear 142 to form a seal between the wall 123 of the central gear carrier housing 122 and the first interior gear 142 on an opposite side of the group of holes 192 from the first output shaft 152. The first interior gear 142 includes a flange that presses against at least one of the ring seals 194 to prevent any lubricating oil from within the central gear carrier housing 122 from reaching and leaking out the holes 192.

A ring seal 196 is also disposed in an inside of the center hole in the ring gear 120 through which the second output shaft 154 passes. The ring seal 196 prevents any lubricating oil from within the central gear carrier housing 122 from leaking out through the center hole in the ring gear 120 along the second output shaft 154. The ring seal 196 may seal against either or both of the second output shaft 154 and the second internal gear 144. The central gear carrier housing 122 also includes a gasket 195 between the end of the interior of the central gear carrier housing 122 which is attached to the ring gear 120 to prevent lubricating oil from leaking out of the central gear carrier housing 122. By being sealed, the illustrated embodiment may use lubricating oil such as differential oil to provide better lubrication, wear protection, and longevity compared to alternative designs that are not sealed. Unsealed alternative designs typically use grease for lubrication instead of oil.

The configuration and design of the illustrated embodiment provides for greater strength and durability than prior locking differential assemblies for model vehicles. In the illustrated embodiment, the differential gear carrier 106 is locked and unlocked directly with the first interior gear 142 by the locking ring 172 sliding the locking pins 174 in and out of recesses 190 in the first interior gear 142. The locking ring 172 is constantly connected and rotating with the locking differential gear carrier 106 so that there is no locking and unlocking action between the differential gear carrier 106 and the locking ring 172. In addition, there is no pin connection between the locking ring 172 and the first output shaft 152. Because the locking pins 174 extend into recesses 190 of the first interior gear 142 in several locations surrounding the first output shaft 152, each locking pin 174 experiences less stress than a single locking pin extending through the center of an output shaft would experience, as in the prior locking clutch assembly of U.S. Pat. No. 8,096,913. In addition, because a locking pin does not extend through the center of the first output shaft 152, the locking differential apparatus 100 does not experience the greater stress of transferring torque from the differential gear carrier to the output shaft in a location weakened by a hole disposed perpendicular to the direction of rotation of the output shaft, as in the prior locking clutch assembly of U.S. Pat. No. 8,096,913. Instead, the torque transfer in the illustrated embodiment goes from the differential gear carrier 106, distribututed through the multiple locking pins 174, and to the first internal gear 142 in multiple locations around the first output shaft 152.

The illustrated embodiment also provides triple bearing support of the differential gear carrier 106. The differential gear carrier 106 is supported within the outer housing 102 at three different points by the ring gear support 124, the central gear carrier support 134, and the gear carrier housing shaft support 164. By being supported at three different points, the entire assembly of the differential gear carrier 106 within the outer housing 102 is protected against bending due to a force applied to the ring gear 120 by the drive gear 108 during locking of the locking differential apparatus 100. This distinction over alternative designs provides more stability given the distance between exterior ends of the first output shaft 152 and the second output shaft 154.

Because the illustrated embodiment includes the locking actuator 176, the locking differential apparatus 100 can be remotely locked and unlocked by a remote control of the locking actuator 176, for example over a radio control system in the case of a radio controlled (R/C) hobby car. Because the locking actuator 176 is enclosed within the outer housing 102, the locking differential apparatus 100 is more rugged and reliable than alternative designs that include a locking actuator exterior to the housing. The locking actuator 176 is protected from the elements by the outer housing 102, and is closely linked to the locking ring 172 by the locking fork 184 to enhance reliability and longevity.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

TABLE OF REFERENCE CHARACTERS 100 locking differential apparatus
102 outer housing
104 bolts
106 differential gear carrier
108 drive gear
110 drive shaft
112 drive shaft supports
114 outer support ring
115 drive shaft cover
116 inner support ring
118 bearings
120 ring gear
122 central gear carrier housing
123 wall
124 ring gear support
126 outer support ring
128 inner support ring
130 ring gear shaft
132 bearings
134 central gear carrier support
136 outer support ring
138 inner support ring
140 bearings
142 first interior gear
144 second interior gear
146 planetary gears
148 gear carrier housing shaft
150 central planetary shafts
151 shaft inserts
152 first output shaft
154 second output shaft
156 first output shaft opening
158 second output shaft opening
160 first output shaft cover
162 second output shaft cover
164 gear carrier housing shaft support
166 outer support ring
168 inner support ring
170 bearings
171 locking actuator assembly
172 locking ring
174 locking pins
176 locking actuator
177 actuator shaft
178 actuator saver
179 double spline
180 actuator saver key protrusion
181 screw
182 flat washer
183 actuator saver spring
184 locking fork
185 locking fork key protrusion
186 levers
188 recess
190 recess
192 holes
194 ring seal
195 gasket
196 ring seal
198 saver sleeve protrusion
199 fork sleeve protrusion

What is claimed is:

1. A locking differential apparatus comprising:
an outer housing;
a drive shaft disposed at least partially within the outer housing;
a differential gear carrier disposed within the outer housing, the differential gear carrier configured to rotate in response to rotation of the drive shaft, the differential gear carrier comprising:
a gear carrier housing;
a first output shaft disposed at least partially within the gear carrier housing;
a disc affixed perpendicular to the first output shaft to rotate synchronously with the first output shaft and disposed within the gear carrier housing, the disc having a recess configured to engage with a pin;
a first internal gear disposed within the differential gear carrier, the first internal gear affixed to the first output shaft and rotating synchronously with the first output shaft on a same axis of rotation, wherein the first internal gear includes a flange that seals a side of the first internal gear adjacent an external wall of the gear carrier housing against the external wall; and
a second output shaft disposed at least partially within the gear carrier housing;
the first output shaft and the second output shaft being differentially linked by the differential gear carrier to maintain a constant relationship between a rotation rate of the drive shaft and the average rotation rate of the first output shaft and the second output shaft while the second output shaft rotates at a variable rate different from a rotation rate of the first output shaft; and
a locking actuator assembly disposed within the outer housing and exterior to the gear carrier housing, the locking actuator assembly comprising the pin disposed in parallel with the first output shaft and passing through the gear carrier housing to selectively engage with the recess of the disc affixed perpendicular to the first output shaft to lock the first output shaft to the gear carrier housing and cause the first output shaft and the second output shaft to rotate synchronously.

2. The locking differential apparatus of claim 1, wherein the locking actuator assembly further comprises a locking ring disposed within the outer housing, the pin affixed to the locking ring, the locking ring movable in a direction parallel with the first output shaft toward the gear carrier housing to engage the pin with the recess of the disc affixed perpendicular to the first output shaft, and movable in a direction parallel with the first output shaft away from the gear carrier housing to disengage the pin from the recess of the disc affixed perpendicular to the first output shaft.

3. The locking differential apparatus of claim 2, wherein the locking actuator assembly further comprises a servo motor disposed within the outer housing and operatively coupled with the locking ring to controllably move the locking ring in a direction parallel with the first output shaft toward and away from the gear carrier housing.

4. The locking differential apparatus of claim 3, wherein the servo motor comprises a servo shaft disposed about perpendicular to the first output shaft, the locking actuator assembly further comprises a fork affixed to the servo shaft to rotate in a same direction as the servo shaft, and the fork controllably moves the locking ring toward and away from the gear carrier housing according to a direction of rotation of the servo shaft.

5. The locking differential apparatus of claim 1, further comprising:
a ring gear disposed within the outer housing, the gear carrier housing affixed on one side to the ring gear, the gear carrier housing rotating synchronously with the ring gear on a same axis of rotation, the external wall of the gear carrier housing being parallel to the ring gear on an opposite side of the differential gear carrier from the ring gear; and
the first internal gear being disposed parallel to the ring gear and proximate the external wall on the opposite side of the differential gear carrier from the ring gear.

6. The locking differential apparatus of claim 5, further comprising:
a second internal gear disposed within the differential gear carrier, the second internal gear affixed to the second output shaft and rotating synchronously with the second output shaft on a same axis of rotation, the second internal gear disposed parallel to the ring gear and proximate the ring gear on a same side of the differential gear carrier as the ring gear; and
a planetary gear disposed within the differential gear carrier perpendicular to and operatively coupled with both the first internal gear and the second internal gear.

7. The locking differential apparatus of claim 5, wherein the disc is integral with the first internal gear.

8. The locking differential apparatus of claim 5, wherein the first internal gear is integral with the first output shaft.

9. The locking differential apparatus of claim 5, wherein the differential gear carrier further comprises three bearings disposed between the gear carrier housing and the outer housing, a first bearing disposed proximate the first output shaft, a second bearing disposed proximate the second output shaft, and a third bearing disposed proximate the first internal gear between the first bearing and the second bearing.

10. The locking differential apparatus of claim 1, wherein the gear carrier housing comprises seals that prevent oil within the gear carrier housing from leaking outside of the gear carrier housing.

11. A locking differential gear carrier comprising:
a gear carrier housing;
a first output shaft disposed at least partially within the gear carrier housing;
an internal gear affixed perpendicular to the first output shaft to rotate synchronously with the first output shaft and disposed within the gear carrier housing, the internal gear having a recess configured to engage with a pin;
a second output shaft disposed at least partially within the gear carrier housing, the first output shaft and the second output shaft being differentially linked by the differential gear carrier to maintain a constant relationship between a rotation rate of the gear carrier housing and the average rotation rate of the first output shaft and the second output shaft while the second output shaft rotates at a variable rate different from a rotation rate of the first output shaft; and
a locking actuator assembly disposed exterior to the gear carrier housing, the locking actuator assembly comprising:
a pin disposed in parallel with the first output shaft and passing through the gear carrier housing to selectively engage with the recess of the internal gear to lock the first output shaft to the gear carrier housing and cause the first output shaft and the second output shaft to rotate synchronously;

a locking ring disposed exterior to the gear carrier housing, the pin affixed to the locking ring, the locking ring movable in a direction parallel with the first output shaft toward the gear carrier housing to engage the pin with the recess of the internal gear, and movable in a direction parallel with the first output shaft away from the gear carrier housing to disengage the pin from the recess of the internal gear; and a servo motor disposed exterior to the gear carrier housing and operatively coupled with the locking ring to controllably move the locking ring in a direction parallel with the first output shaft toward and away from the gear carrier housing.

12. The locking differential gear carrier of claim 11, wherein the servo motor comprises a servo shaft disposed about perpendicular to the first output shaft, the locking actuator assembly further comprises a fork affixed to the servo shaft to rotate in a same direction as the servo shaft, and the fork controllably moves the locking ring toward and away from the gear carrier housing according to a direction of rotation of the servo shaft.

13. The locking differential gear carrier of claim 11, further comprising:

a ring gear affixed on one side to the gear carrier housing, the gear carrier housing rotating synchronously with the ring gear on a same axis of rotation, the gear carrier housing having an external wall parallel to the ring gear on an opposite side of the differential gear carrier from the ring gear;

wherein the first internal gear is disposed parallel to the ring gear and proximate the external wall on the opposite side of the differential gear carrier from the ring gear.

14. The locking differential gear carrier of claim 11, further comprising:

a second internal gear disposed within the differential gear carrier, the second internal gear affixed to the second output shaft and rotating synchronously with the second output shaft on a same axis of rotation, the second internal gear disposed parallel to the ring gear and proximate the ring gear on a same side of the differential gear carrier as the ring gear; and a planetary gear disposed within the differential gear carrier perpendicular to and operatively coupled with both the first internal gear and the second internal gear.

15. The locking differential gear carrier of claim 11, wherein the first internal gear is integral with the first output shaft.

16. The locking differential gear carrier of claim 11, wherein the differential gear carrier further comprises three bearings disposed between the gear carrier housing and the outer housing, a first bearing disposed proximate the first output shaft, a second bearing disposed proximate the second output shaft, and a third bearing disposed proximate the first internal gear between the first bearing and the second bearing.

17. The locking differential gear carrier of claim 11, wherein the first internal gear includes a flange that seals a side of the first internal gear adjacent the external wall against the external wall.

18. The locking differential apparatus of claim 11, wherein the gear carrier housing comprises seals that prevent oil within the gear carrier housing from leaking outside of the gear carrier housing.

* * * * *